(12) United States Patent
Vance et al.

(10) Patent No.: US 8,458,348 B2
(45) Date of Patent: Jun. 4, 2013

(54) MULTIPROCESSING OF DATA SETS

(75) Inventors: Eric Vance, Denver, CO (US); Ron Bolei, Littleton, CO (US); Jack W. Hurdelbrink, Thornton, CO (US)

(73) Assignee: Oracle International Corporation, Redwood Shores, CA (US)

( * ) Notice: Subject to any disclaimer, the term of this patent is extended or adjusted under 35 U.S.C. 154(b) by 230 days.

(21) Appl. No.: 13/092,537

(22) Filed: Apr. 22, 2011

(65) Prior Publication Data

US 2012/0272041 A1 Oct. 25, 2012

(51) Int. Cl.
*G06F 15/16* (2006.01)
(52) U.S. Cl.
USPC .............. 709/229; 712/25; 707/694; 707/781
(58) Field of Classification Search
USPC ..................... 709/229; 712/25; 707/694, 781
See application file for complete search history.

(56) References Cited

U.S. PATENT DOCUMENTS

| | | | | |
|---|---|---|---|---|
| 6,105,069 A | * | 8/2000 | Franklin et al. | 709/229 |
| 6,275,825 B1 | * | 8/2001 | Kobayashi et al. | 707/737 |
| 6,633,884 B2 | * | 10/2003 | Martin et al. | 707/802 |
| 6,763,344 B1 | * | 7/2004 | Osentoski et al. | 1/1 |
| 7,403,946 B1 | * | 7/2008 | Taylor | 707/612 |
| 7,634,455 B1 | * | 12/2009 | Keene et al. | 1/1 |
| 7,720,824 B2 | * | 5/2010 | Barsness et al. | 707/694 |
| 7,739,298 B1 | * | 6/2010 | Crim et al. | 707/781 |
| 7,958,146 B2 | * | 6/2011 | Crim et al. | 707/781 |
| 8,321,391 B2 | * | 11/2012 | Labuda | 707/703 |
| 2003/0084341 A1 | * | 5/2003 | Ramachandran et al. | 713/201 |

* cited by examiner

*Primary Examiner* — Thomas Dailey
(74) *Attorney, Agent, or Firm* — Kilpatrick Townsend & Stockton LLP

(57) ABSTRACT

Various arrangements for processing data sets using multiple processors are presented. A plurality of constraints may be received by a computer system. Each constraint may identify a data relationship that requires a subset of records of one or more data sets to be processed by a same processing device. A plurality of final constraints may be calculated. Each final constraint of the plurality of final constraints may be linked with a record. Each final constraint of the plurality of final constraints may be at least partially based on the plurality of constraints. Final constraints of the plurality of final constraints having a same value may be linked with records that are to be processed by the same processing device. At least partially based on the final constraint, the set of records may be distributed to a plurality of processing devices for processing.

20 Claims, 10 Drawing Sheets

| Order Number | Line No. | Item Number | Shipping Facility | Quantity Ordered | Unit Price | Unit Cost | Available to Pick |
|---|---|---|---|---|---|---|---|
| 1 | 1 | BDJACKET1 | 30 | 3 | 33.00 | 14.00 | |
| 1 | 2 | BDJACKET2 | 30 | 3 | 33.00 | 13.00 | |
| 2 | 1 | BDJACKET3 | 30 | 3 | 44.00 | 13.00 | |
| 2 | 2 | BDJACKET4 | 30 | 4 | 44.00 | 12.00 | |
| 2 | 3 | BDJACKET5 | 30 | 5 | 35.00 | 12.00 | |
| 3 | 1 | BDJACKET6 | 30 | 70 | 33.00 | 13.00 | |
| 4 | 1 | BDJACKET7 | 30 | 40 | 44.33 | 15.00 | |
| 5 | 1 | BDJACKET8 | 30 | 3 | 44.00 | 12.00 | |
| 6 | 1 | BDJACKET1 | 10 | 20 | 55.00 | 12.00 | |
| 6 | 2 | BDJACKET2 | 10 | 10 | 60.00 | 20.00 | |
| 7 | 1 | BDJACKET3 | 30 | 2 | 70.00 | 12.00 | |
| 7 | 2 | BDJACKET9 | 30 | 1 | 80.00 | 15.00 | |
| 7 | 3 | BDJACKET10 | 30 | 3 | 100.00 | 14.00 | |
| 8 | 1 | BDJACKET11 | 30 | 1 | 30.00 | 12.00 | |
| 8 | 2 | BDJACKET12 | 30 | 2 | 40.00 | 13.00 | |
| 8 | 3 | BDJACKET13 | 30 | 4 | 33.00 | 13.00 | |
| 9 | 1 | BDJACKET14 | 30 | 3 | 33.00 | 12.00 | |
| 9 | 2 | BDJACKET15 | 30 | 2 | 44.00 | 11.00 | |
| 10 | 1 | BDJACKET16 | 10 | 1 | 44.00 | 11.00 | |

FIG. 2

| Order Number | Line No. | Item Number | Facility Number | Constraint 1 | Constraint 2 |
|---|---|---|---|---|---|
| 1 | 1 | BDJACKET1 | 30 | 1 | 1 |
| 1 | 2 | BDJACKET2 | 30 | 1 | 2 |
| 2 | 1 | BDJACKET3 | 30 | 2 | 3 |
| 2 | 2 | BDJACKET4 | 30 | 2 | 4 |
| 2 | 3 | BDJACKET5 | 30 | 2 | 5 |
| 3 | 1 | BDJACKET6 | 30 | 3 | 6 |
| 4 | 1 | BDJACKET7 | 30 | 4 | 7 |
| 5 | 1 | BDJACKET8 | 30 | 5 | 8 |
| 6 | 1 | BDJACKET1 | 10 | 6 | 9 |
| 6 | 2 | BDJACKET2 | 10 | 6 | 10 |
| 7 | 1 | BDJACKET3 | 30 | 7 | 3 |
| 7 | 2 | BDJACKET9 | 30 | 7 | 11 |
| 7 | 3 | BDJACKET10 | 30 | 7 | 12 |
| 8 | 1 | BDJACKET11 | 30 | 8 | 13 |
| 8 | 2 | BDJACKET12 | 30 | 8 | 14 |
| 8 | 3 | BDJACKET13 | 30 | 8 | 15 |
| 9 | 1 | BDJACKET14 | 30 | 9 | 16 |
| 9 | 2 | BDJACKET15 | 30 | 9 | 17 |
| 10 | 1 | BDJACKET16 | 10 | 10 | 18 |

FIG. 4

MULTIPROCESSING OF DATA SETS

BACKGROUND

This invention relates, in general, to processing and updating data sets. More specifically, this invention relates to using multiple processing devices to update large data sets.

In complex commercial and industrial settings, data sets within databases may contain a significant amount of interrelated data. For example, one data set may pertain to orders received from customers, while another data set may be related to inventory of items at a warehouse (which may be affected by fulfillment of orders). Periodically, such as once per day or week, these data sets may need to be updated to reflect changes. Typically, due to interdependencies of the data within the data sets, all of the processing may be performed by a single processor or processing device. Due to the complexity and/or size of these data sets, updating the data sets may take a significant amount of time, such as several hours. Decreasing the amount of time to process such data sets may be beneficial.

SUMMARY

In some embodiments, a method for processing data sets using multiple processors is presented. The method may include receiving, by a computer system, a plurality of data sets. Each data set may comprise a plurality of records. Each record may comprise a plurality of fields. The pluralities of records from the plurality of data sets may, in total, be referred to as the set of records. At least a subset of the plurality of records within each data set may be linked with records within another data set. The method may include receiving, by the computer system, a plurality of constraints. Each constraint of the plurality of constraints may identify a data relationship that requires a subset of the set of records to be processed by a same processing device. The method may include calculating, by the computer system, a plurality of final constraints. Each final constraint of the plurality of final constraints may be linked with a record. Each final constraint of the plurality of final constraints may be at least partially based on the plurality of constraints. Final constraints of the plurality of final constraints may have a same value are linked with records that are to be processed by the same processing device. The method may include distributing, by the computer system, at least partially based on the final constraint, the set of records to a plurality of processing devices for processing.

In some embodiments, the method includes calculating, by the computer system, at least partially based on the plurality of final constraints, subsets of the set of records that are to be processed by each processing device of the plurality of processing devices. The method may include creating, by the computer system, a work table. The work table may comprise the set of records. The work table may be used to calculate the plurality of final constraints. The plurality of data sets may represent enterprise resource planning information. The method may include calculating, by the computer system, a number of processing devices to include in the plurality of processing devices for processing the set of records. The method may include receiving, by the computer system, from a user, a number of processing devices to include in the plurality of processing devices for processing the set of records. The method may include processing receiving, by the computer system, from the user, an indication of a process to be balanced, wherein the process is linked with the plurality of datasets. At least one dataset of the plurality of data sets may comprise sales records.

In some embodiments, a computer program product residing on a non-transitory processor-readable medium and comprising processor-readable instructions is presented. The processor readable instructions may be configured to cause a processor to receive a plurality of data sets. Each data set may comprise a plurality of records. Each record may comprise a plurality of fields. The pluralities of records from the plurality of data sets may, in total, be referred to as the set of records. At least a subset of the plurality of fields within each data set may be linked with fields within another data set. The processor readable instructions may be configured to cause a processor to receive a plurality of constraints. Each constraint of the plurality of constraints may identify a data relationship that requires a subset of the set of records to be processed by a single processing device. The processor readable instructions may be configured to cause a processor to calculate a plurality of final constraints. Each final constraint of the plurality of final constraints may be linked with a record. Each final constraint of the plurality of final constraints may be at least partially based on a subset of the plurality of constraints. Final constraints of the plurality of final constraints having a same value may be linked with records that are to be processed by the single processing device. The processor readable instructions may be configured to cause a processor to distribute at least partially based on the final constraint, the set of records to a plurality of processing devices for processing.

In some embodiments, a system for processing data sets using multiple processors is presented. The system may include a processor. The system may also include a memory communicatively coupled with and readable by the processor and having stored therein a series of instructions. When executed, the instructions may cause the processor to receive a plurality of data sets. Each data set may comprise a plurality of records. Each record may comprise a plurality of fields. The pluralities of records from the plurality of data sets may, in total, be referred to as the set of records. At least a subset of the plurality of fields within each data set may be linked with fields within another data set. When executed, the instructions may cause the processor to receive a plurality of constraints. Each constraint of the plurality of constraints may identify a data relationship that requires a subset of the set of records to be processed by a single processing device. When executed, the instructions may cause the processor to calculate a plurality of final constraints. Each final constraint of the plurality of final constraints may be linked with a record. Each final constraint of the plurality of final constraints is at least partially based on a subset of the plurality of constraints. Final constraints of the plurality of final constraints having a same value may be linked with records that are to be processed by the single processing device. When executed, the instructions may cause the processor to distribute at least partially based on the final constraint, the set of records to a plurality of processing devices for processing. The system may include the plurality of processing devices, wherein each of the plurality of processing devices is configured to: receive a portion of the set of records, wherein each portion of the set of records is distributed at least partially based on the plurality of final constraints; and process the portion of the set of records.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2 illustrates an embodiment of a data set.

FIG. 4 illustrates an embodiment of a work table with a first and second constraint.

DETAILED DESCRIPTION

Rather than processing (e.g., updating) related data sets using the same processing device (e.g., computer system), multiple processing devices may be used. To use multiple processing devices, related records within the data sets may be identified. Related records may be processed by the same processing device to ensure that relationships between the linked records are maintained. As such, changes made to a record of a data set by one processing device may not impact changes made to an unrelated record by a different processing device. By using multiple processing devices to process data sets, the amount of time to process the data sets may be decreased, perhaps significantly. For example, using eight processing devices to process related data sets may result in the amount of time to process the data sets decreasing substantially, such as by a factor of eight.

In order to group records that need to be processed together, one or more constraints may either be identified by a computer system or a user. These constraints can relate to relationships between data within the data sets (e.g., fields within records that are related to fields in other records of other data sets). Using these constraints, a final constraint for each record may be determined. These final constraints may identify groups of records that should be processed by the same processing device. The records may be apportioned to different processing devices based on the number of processing devices available, the processing capability of each processing device, the final constraints, and the number of records to be processed. Once it has been determined which processing devices are to process which groups of records, the groups of records may be distributed to the processing devices or otherwise alerted as to which records should be processed. The multiple processing devices may then process their respective portions of the data sets without affecting information in other portions of data sets being processed by other processing devices.

Figure 1:
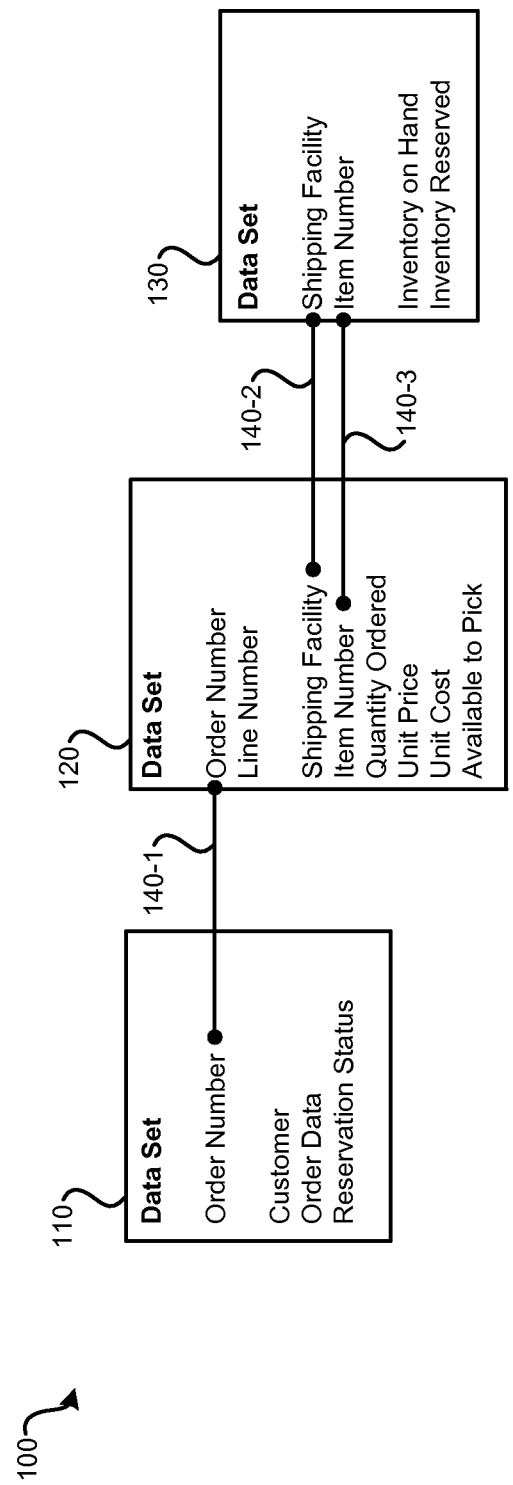
FIG. 1 illustrates an embodiment of linked data sets.

FIG. 1 illustrates an embodiment 100 of linked data sets. Embodiment 100 contains three linked data sets: data set 110, data set 120, and data set 130. Each data set may contain a number of records. Each record may contain various fields. Each of these fields may contain information. Data sets may be part of the same database or of different databases. Further, data sets 110, 120, and 130 may be stored by the same computer system or different computer systems.

In embodiment 100, each record within data set 110 contains fields pertaining to: 1) order number; 2) customer; 3) order data; and 4) reservation status. Data set 120, which may be stored within the same database as data set 110, a different database, and/or a different computer system, may contain a field linked to a field within data set 110. For example, the order number field of data set 120 may be linked to the order number field of data set 110, illustrated by connector 140-1. As such, for each record of data set 110 that has an order number field, this order number field may be linked to a corresponding order number field of a record in data set 120.

In embodiment 100, each record within data set 120 contains fields pertaining to: 1) order number; 2) line number; 3) shipping facility; 4) item number; 5) quantity order; 6) unit price; 7) unit cost; and 8) whether the item is available to pick. As previously noted, the order number field of each record may be linked to a corresponding order number field in dataset 110. Data set 120 may also have two additional fields that are linked with fields in another data set: shipping facility and item number are linked with corresponding fields within data set 130, illustrated by connector 140-2 and 140-3, respectively.

These relationships between the fields of order numbers, shipping facilities, and item numbers may result in constraints. For example, if the "quantity ordered" field of a particular record in data set 120 is modified, because the item number field of data set 120 is linked with the item number field of data set 130, the "inventory reserved" field may need to be updated in the corresponding record in data set 130, as such modification of a record in data set 120 may affect a corresponding record in data set 130.

While embodiment 100 discusses three data sets having three dependencies, it should be understood that this is for example purposes only. Other embodiments may have more or fewer dependencies and more or fewer data sets. If implemented in a corporate setting, such as in the context of a enterprise resource planning system (which may be used to manage inventory, sales, and/or orders across a large entity), many more dependencies and data sets may be present. Further, each of these data sets may have dozens, thousands, or hundreds of thousands of entries. Moreover, it should be understood that the various types of fields present within the datasets and records are for example purposes only. Similarly, data sets that pertain to information other than orders, sales, shipping, and inventory may be possible.

FIG. 2 illustrates an embodiment of a data set 200. Data set 200 may be in the form of a table. Each field may contain a piece of information in the table. For example, field 220 contains an order number. A record, such as record 210 of data set 200, may be presented as a row in the table. Each column within the table may be linked with a specific category of field. For example, field 230 specifies that its column is linked with a "line number" (within an order). Referring to column 240, its category is "shipping facility," which, in data set 200, is indicated by a numerical code.

At various intervals of time, data set 200 may be processed in order to update and/or modify the contents of data set 200. As described in relation to embodiment 100 of FIG. 1, various records within data set 200 may need to be processed by the same processing device as other records because of relationships with such records in other data sets. As an example, data set 200 may represent data set 120 of FIG. 1. As such, the categories of order number, shipping facility, and item number may be linked with corresponding fields in other data sets. As such, values of fields within records, such as record 210 of data set 200 may be affected by and/or affect the values of fields within records of other data sets.

As such, various "constraints" can be established in order to ensure that records are linked with each other. As such, a constraint may define a relationship between various pieces of data (e.g., fields, records) that are present within the same data set or across multiple data sets. As an example, one possible constraint is related to the "order number." As such, each record that pertains to the same order may be processed using the same processing device. Referring to data set 200, each order has one or more records associated with it. If "order number" is treated as a constraint, then each record linked with the same order may be processed using the same processing device. As another example of a constraint, a record may be "reserved," such as indicated by the "reservation status" field of data set 110 of FIG. 1. A reserved status may indicate that the record is not to be processed, should be processed at another time, and/or is required to be processed by a particular processing device. As such, depending on the reservation status of a record, a particular processing device may be required to process the record. Another possible constraint may be "shipment facility." As such, all records pertaining to a particular shipping facility may be processed using the same processing device. Shipping facility may be treated as a constraint to facilitate a manager of an individual shipment facility being provided with a listing of inventory that needs to be distributed from a particular warehouse.

Figure 3:
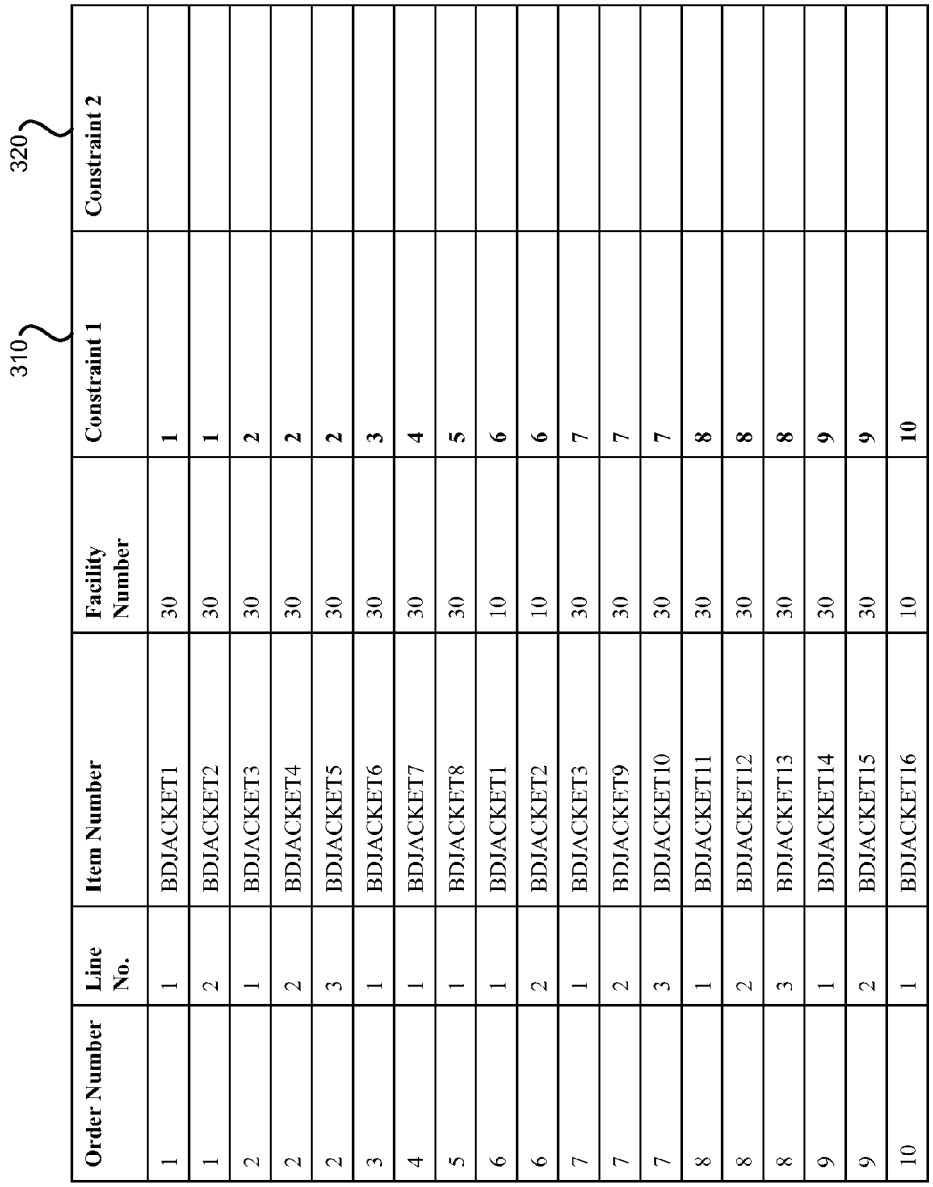
FIG. 3 illustrates an embodiment of a work table with a first constraint.

In order to process multiple data sets using multiple processing devices, a work table (also referred to as a work data set) may be created. FIG. 3 illustrates an embodiment of a work table 300 with a first constraint. Work table 300 may contain fields from multiple data sets. As such, to create work table 300, fields from multiple data sets may be used. Therefore, work table 300 may store information in one data set that is otherwise stored across multiple data sets. Work table 300 may also contain fields for each constraint that has been identified by a user or the computer system. In work table 300, two constraints are present: constraint 310 and constraint 320. Constraint 310 may define that each order is to be processed by the same processing device. As such, a field lined with constraint 310 identifies a value specific to each order number. For example, each line of the first order has a constraint of "1," each line of order 2 has a constraint of "2." Therefore, according to the first constraint, order 1 and order 2 can be processed by different processing devices;

however, each line of order 1 is to be processed by the same processing device, and each line of order 2 is to be processed by the same processing device.

FIG. 4 illustrates an embodiment of a work table 400 with a first constraint and a second constraint. Work table 400 may represent work table 300 of FIG. 3 with fields added for a second constraint. Constraint 320 defines that quantities of the same item to be shipped from the same facility are to be processed by the same processing device. As such, constraint 320 provides a different value to each combination of an item number and facility number. Record 410 (the row which contains order number 1, line number 1) has a combination of item number "BDJACKET1" and Facility Number "30." As such, constraint 320 is assigned a value of 1. Record 420 (the row which contains order number 1, line number 2 has a combination of item number "BDJACKET2" and Facility Number "30." Since this combination of item number and facility number is different from record 410, constraint 320 is assigned a different value: 2. As such, processing of the records according to constraint 320 does not require that records 410 and 420 of order 1 be processed by the same processing device.

Record 430 (the row which contains order number 2, line number 1) has a combination of item number "BDJACKET4" and Facility Number "30." Since this combination of item number and facility number is different from that of either constraint 1 or constraint 2, constraint 320 is assigned a different value: 3. Skipping ahead to record 440 (the row which contains order number 7, line number 1), an item number "BDJACKET3" and facility number "30" are present. This combination of item number and facility number is also present in record 430. As such, because both the item number and the facility number match, constraint 320 is the same for both of these records. As such, record 440 is assigned the same constraint 320 as record 430 of work table 400, thereby requiring that these records be processed by the same processing device. The remaining records of work table 400 may have constraint 320 populated in a similar manner. As such, FIG. 4 illustrates constraint 320 populated for each record.

Using the two constraints of work table 400, a final constraint may be calculated using constraint 310 (identified in FIG. 3) and constraint 320 (identified in FIG. 4). While work tables 300 and 400 contain two constraints, it should be understood that fewer (such as one) constraints may be present or more constraints (such as three, five, twenty, a hundred) may be present. These constraints may be identified by a user. For example, a user may determine that each order should be processed by the same processing device and that each instance of the same item number at the same shipping facility should be processed by the same processing device. Constraints may also be identified by the computer system processing work table 400. Constraints may be tied to fields other than "order number" and the combination of item number and facility number. Constraints 310 and 320 are intended to serve only as examples.

Figure 5:
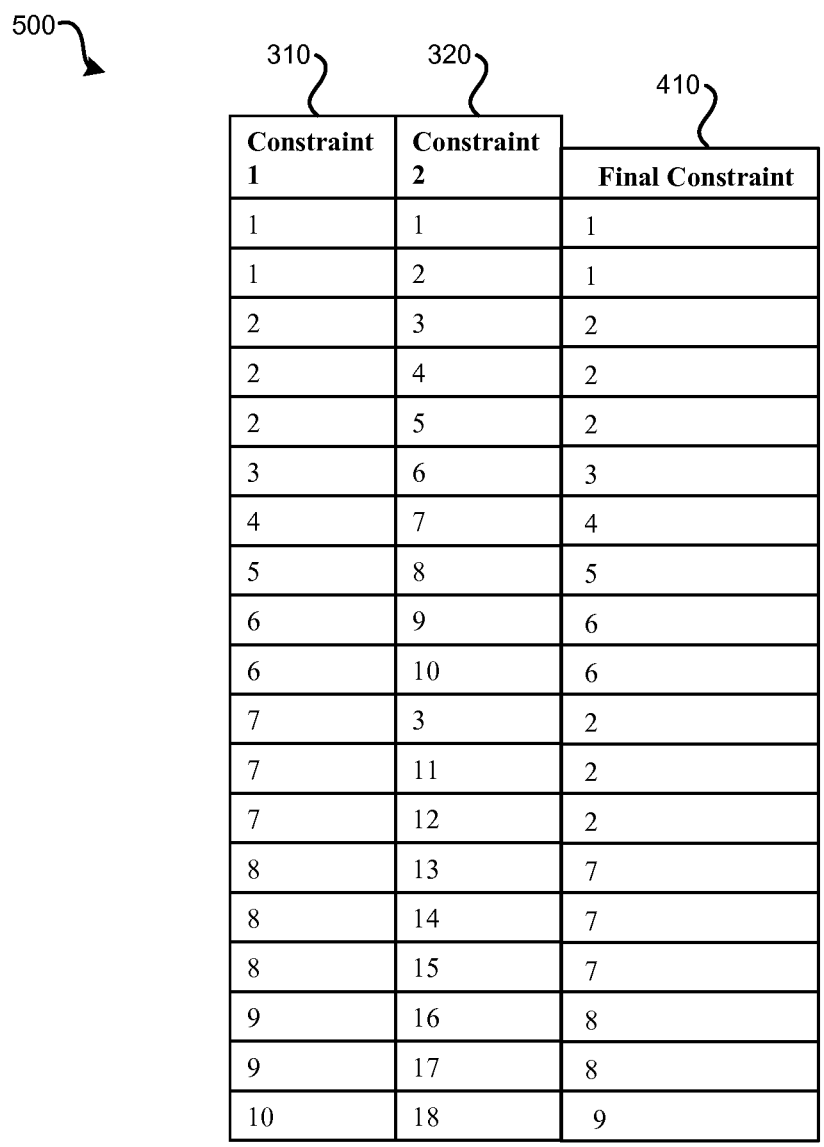
FIG. 5 illustrates an embodiment of a final constraint.

FIG. 5 illustrates an embodiment 500 of a final constraint 410 that is calculated based on a first constraint and a second constraint. Constraint 310 and constraint 320 were previously calculated in relation to FIGS. 3 and 4. The value of a constraint 310 for record 1 is 1 and is 1 for constraint 2, this first record is assigned a final constraint 410 of 1. Record 2 has a constraint 310 of 1 and a constraint 320 of 2. This may mean that according to constraint 320, record 2 may be processed by a different processing device than record 1. However, according to constraint 310, because the value of constraint 210 is the same as constraint 210 of record 1, record 1 and record 2 are to be processed by the same processing device. As such, record 2 is provided with the same final constraint 410 value of record 1: 1.

Referring to record 3, record 3 has a value of 2 for constraint 310, and a value of 3 for constraint 320. Constraint 310 is different from the previous values of constraint 310 and constraint 320 is different from the previous values of constraint 320, as such, record 3 may not need to be processed by the same processing device that will process records 1 and 2. Therefore, record 3 is given a different final constraint 410 value: 2. As such, by inspecting only the value of the final constraint, it may be determined that record 3 is not required to be processed by the same processing device as either record 1 or record 2. Record 4 has a constraint 310 of 2 and a constraint 320 of 4. Since constraint 310 of record 4 is the same as constraint 310 of record 3, record 4 is to be processed by the same processing device as record 3. As such, the final constraint of record 4 is assigned the same value as the final constraint 410 value of record 3. Again, by inspecting only the value of the final constraint for record 4, it may be determined that record 4 and record 3 are to be processed using the same processing device.

As a final example, referring to record 11, constraint 310 is 7 and constraint 320 is 3. Since constraint 320 matches the value of constraint 320 of record 3, these two records are to be processed by the same processing device. As such, record 11 is assigned a final constraint 410 value of 2 to match record 3.

Calculation of the values of final constraint 410 may be performed similarly for the remainder of the records present in the work table. In embodiment 500, only a portion of the work table is illustrated for simplicity. It should be understood that the final constraint column may be present in the work tables of FIGS. 3 and 4. In some embodiments, the constraints and final constraint may be maintained in a separate data set or work table.

Figure 6:
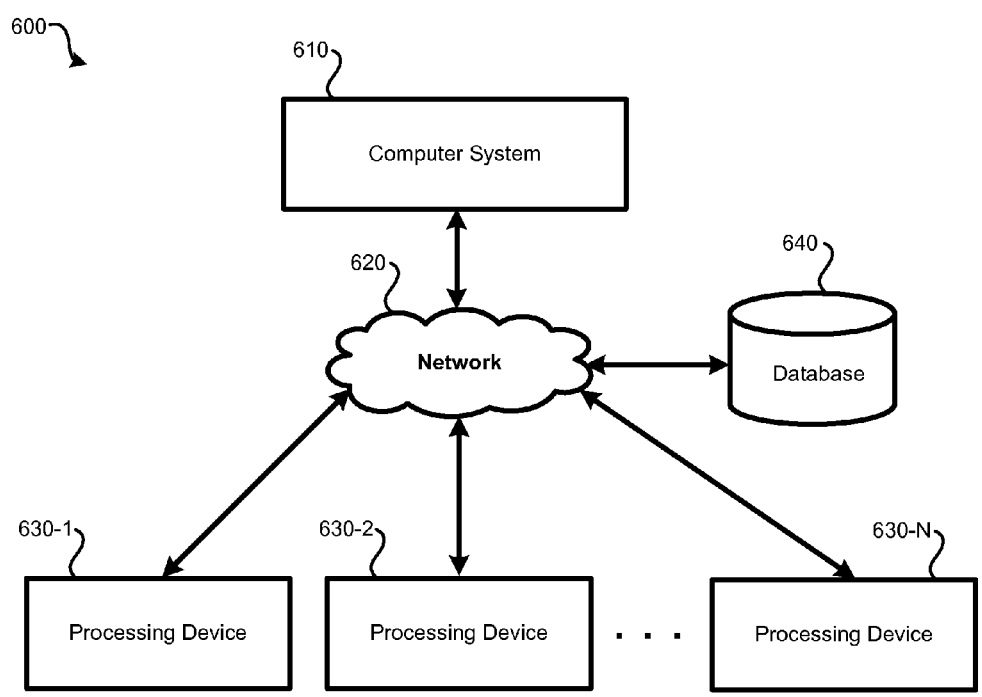
FIG. 6 illustrates an embodiment of a system for processing portions of data sets by multiple processing devices.

Once a value of the final constraint has been determined for each record, various records may be assigned to different processing devices for processing, such as updating. Records having the same final constraint may be processed by the same processing device. While records having different final constraints may be processed by the same processing device or a different processing device. FIG. 6 illustrates an embodiment of a system 600 for processing portions of data sets (e.g., records) by multiple processing devices.

System 600 includes: computer system 610, network 620, processing devices 630-1 through 630-N, and database 640. Computer system 610, which may be a computer system as described in relation to FIG. 10, may: receive user input, create the work table, determine the final constraint, and assign processing devices various portions of data sets to process. Computer system 610 may communicate with a number of processing devices either directly or via a network, such as network 620. Network 620 may represent a private network, such as an intranet, a public network, such as the Internet, or some combination thereof.

One or more processing devices may be present in system 600. In the illustrated embodiment of system 600, three processing devices are illustrated: processing device 630-1, processing device 630-2, and processing device 630-N. Processing device 630-N is intended to illustrate that the number of processing devices may vary. For example, it may be efficient for a complicated set of data sets to be processed using five, ten, or twenty or more processing devices. Further, the number of processing devices used to process data sets may be varied based on other processes being performed by processing devices 630. For example, at certain times fewer processing devices 630 may be available to process data sets due to resources being devoted to other activities, some processing devices of processing devices 630 being offline, and/or some processing devices of processing device 630 being reserved such that they are available for other processes. Therefore, as an example, system 600 may have three processing devices available one day for processing data sets, but the next day may have five available processing devices.

Figure 10:
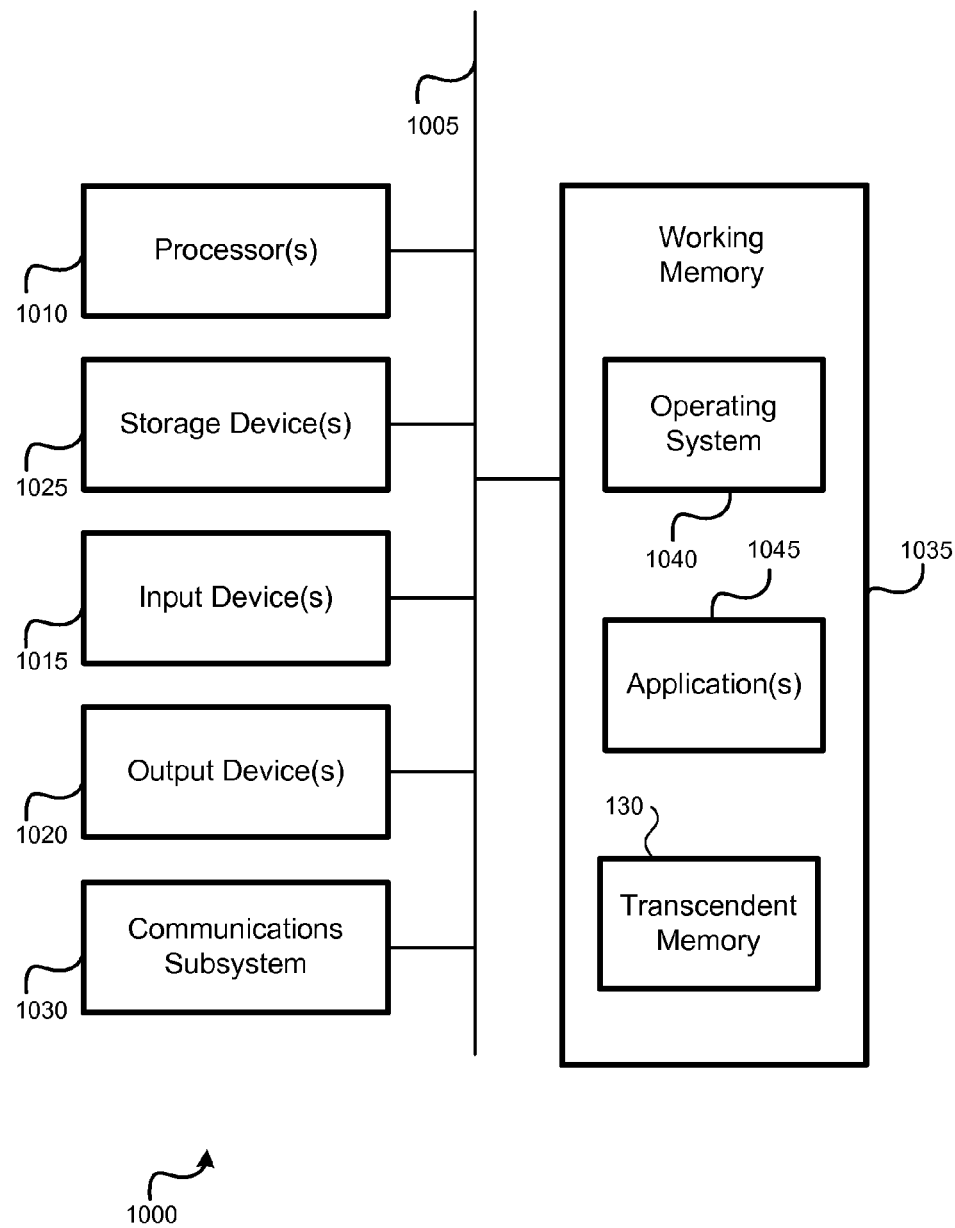
FIG. 10 illustrates an embodiment of a computer system.

Processing devices 630 may each be a computer system, such as the computer system described in relation to FIG. 10. Processing devices 630 may be servers. In some embodiments, processing devices 630 may be processing components of a single server. For example, processing devices 630 may be separate processing units of a single server. In some embodiments, some or all of processing devices 630 may be personal computers. For example, to process data sets, computer systems that serve as desktop systems for various users by day may be used to process data sets at night, when the users are typically not using the desktop systems. As such, a network of several (or possibly hundreds of) desktop computers may be used to process data sets. Processing devices 630 may be a combination of higher powered computer systems and lower powered computer systems. For example, processing device 630-1 may be a modern server that is capable of handling a large amount of processing, while processing device 630-2 may be a server that is several years old and can handle less processing than processing device 630-1.

In some embodiments, computer system 610 may also serve as a processing device. As such, when computer system 610 assigns each processing device of processing devices 630 to process certain portions of data sets, it may assign itself a portion of the data sets to process. When portions of data sets are to be processed by processing device 630, computer system 610 may transfer the associated portion of the data sets to each processing device 630. For example, computer system 610 may access database 640 (which is illustrated as accessible via network 620 but may also only be accessible locally to computer system 610) and transfer the relevant portion of the data sets (or work table) to the appropriate processing device of processing devices 630. In some embodiments, computer system 610 may provide an indication of what portions of data sets (or the work table) that a processing device of processing devices 630 is to process to the appropriate processing device. That processing device may retrieve the appropriate portions of the data sets for processing from database 640. As an example, if computer system 610 provides an indication to processing device 630-1 that records 4-8 and 12 are to be updated by processing device 630-1, processing device 630-1 may then retrieve those specific records from database 640.

Once processing devices 630 have received and processed their respective portions of the data sets, processing devices 630 may individually inform computer system 610, transfer the updated portions of the data sets to computer system 610, and/or update their respective portions of the data sets in database 640. In some embodiments, a processing device, after completing its processing of a portion of the data sets, may wait until computer system 610 contacts the processing device to retrieve the processed portion of the data sets.

Figure 7:
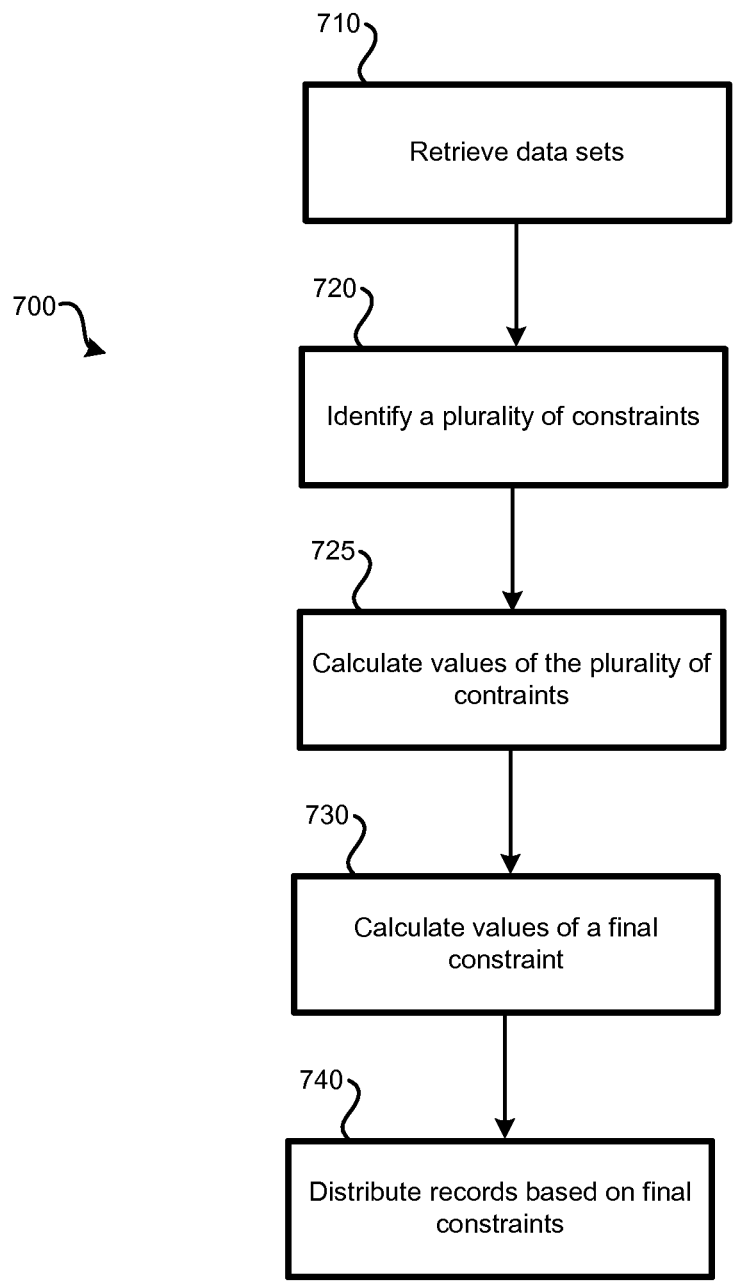
FIG. 7 illustrates an embodiment of a method for distributing portions of data sets for processing using multiple processing devices.

System 600 may be used to create the constraints of FIGS. 3-5, receive user input, and process data sets using multiple processing devices. Further, system 600 or some other system may be used to perform various methods for processing data sets using multiple processing devices. FIG. 7 illustrates an embodiment of a method 700 for distributing portions of data sets for processing to multiple processing devices.

At stage 710, various data sets may be retrieved by a computer system. For example, referring to system 600 of FIG. 6, this may involve computer system 610 accessing database 640 to retrieve data sets. In some embodiments, retrieving data sets may involve downloading or otherwise acquiring data sets from some other source than a database. In some embodiments, retrieving data sets may involve accessing a (non-transitory) computer-readable storage medium, such as a hard drive that is local to computer system 610. In some embodiments, the computer-readable storage medium may be remote from computer system 610.

At stage 720, one or more constraints may be identified. These constraints may be received from a user. For example, a user may be presented with a graphical user interface to view the data sets that are to be processed. The user may provide input that identifies various categories of records or other portions of data sets that should be processed by the same processing device. For example, these constraints may indicate records that should be processed by the same processing device because: 1) the records relate to the same product; 2) the records relate to the same facility; and 3) the records relate to the same order. Other constraints are also possible.

In some embodiments, some or all of the constraints may be identified by a computer system, such as computer system 610 of FIG. 6, rather than by a user. For example, based on the fields present in the data sets, a computer system may be able to determine (possibly based on rules previously defined by a user) which fields and/or records are linked and should be processed by the same processing device. At stage 725, the values of the constraints identified at stage 720 may be calculated.

At stage 730, a value of a final constraint may be calculated for some or all of the records of the data sets. The creation of the final constraint for each record may be based on the value of the other constraints. As such, the value of the final constraint of each record identifies groups of records (e.g., the portions of the data sets) that should be processed using the same processing device.

At stage 740, records may be distributed to various processing devices for processing, such as updating. More specifically, each record that has the same value for a final constraint may be distributed to the same processing device. Each processing device may receive multiple groups of records (e.g., portions of data sets), wherein records of each group have the same final constraint. By way of example only, a processing device may receive all of the records that have a final constraint of "4" and of "8."

Figure 8:
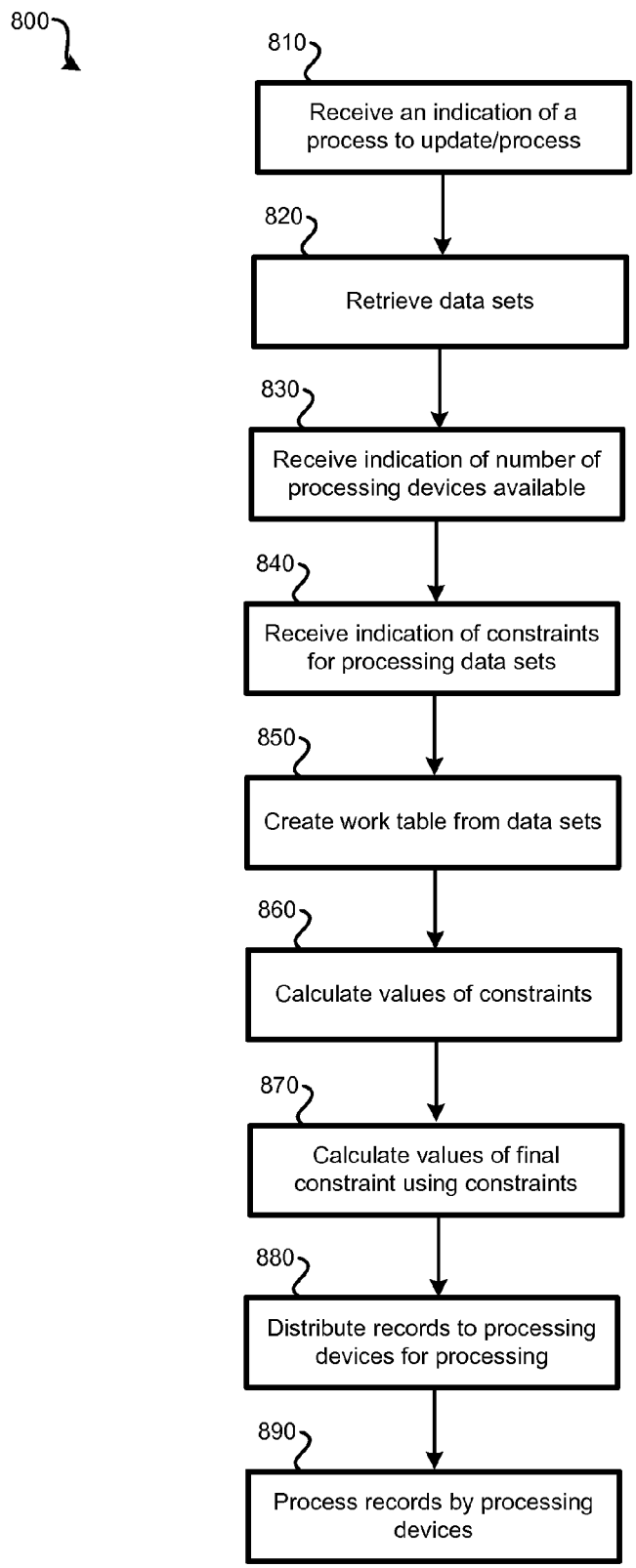
FIG. 8 illustrates an embodiment of a method for processing data sets using multiple processing devices.

FIG. 8 illustrates an embodiment of method 800 for processing data sets using multiple processing devices. Method 800 may be performed by system 600 of FIG. 6, or by some other system that can process data sets using multiple processing devices. At stage 810, a user may provide an indication of a data set or process that is to be processed (e.g., updated). For example, a user may be presented with a list of various processes that run periodically. The user may then select the process that the user wishes to have updated. In some embodiments, the computer system performing stage 810 may periodically identify one or more processes to be updated. As such, the indication of the process that is to be processed may be received from a computer system rather than a user.

At stage 820, one or more data sets may be retrieved by the computer system. These data sets may be determined based on the process indicated at stage 810. For example, a certain process may be entitled "R27613" and may involve the updating of all of a company's sales and inventory data sets. Accordingly, the data sets retrieved at stage 820 may be some or all of the data sets that are linked with process "R27613." While embodiment 100 of FIG. 1 contains three data sets, it should be understood that a process, such as exemplary process R27613 may contain hundreds, thousands, or tens of thousands of data sets. As an example of a potentially complicated process, an enterprise resource planning (ERP) system may contain tens of thousands of data sets, potentially scattered across multiple databases. Stage 820 may involve a computer system, such as computer system 610, accessing one or more databases, such as database 640. In some embodiments, retrieving data sets may involve downloading or otherwise acquiring data sets from some other source than a database. In some embodiments, retrieving data sets may involve accessing a (non-transitory) computer-readable storage medium, such a hard drive that is local to computer system 610. In some embodiments, the computer-readable storage medium may be remote from computer system 610.

At stage 830, an indication of the number of processing devices available for processing the data sets (or being allocated to process the data sets) may be received. A user may specify the number of processing devices that are available (or that the user wishes to use) to process the data sets. The greater number of processing devices specified by the user, the faster the processing of the data sets may proceed. However, the greater the number of processing devices allocated to processing the data sets, the fewer the number of processing devices that may be available to perform other tasks. In some embodiments, the user may specify an amount of time in which the user wishes the processing to complete. Based upon the amount of time specified by the user, the computer system (such as computer system 610 of FIG. 6) may select the number of processing devices.

In some embodiments, the computer system may automatically select the number of processing devices to use to process the data sets. In order to determine the number of processing devices, the computer system may analyze other tasks that are required to be performed by processing devices during the time the number the processing devices will process the data sets. The computer system may use historical data to identify approximately how long processing of the data sets will require to complete. If the historical amount of time is above a maximum threshold value, the number of processors allocated to process the data sets may be increased. Conversely, if the historical amount of time is below a minimum threshold value, the number of processors allocated to process the data sets may be decreased.

At stage 840, constraints may be received from a user and/or determined by the computer system. A constraint may indicate a relationship between records that requires groups of records to be processed by the same processing device. These constraints may be defined by a user. For example, the user may be presented with a graphical user interface to view the data sets that are to be processed. The user may provide input that identifies constraints that define what portions of data sets should be processed by the same processing device. For example, constraints may indicate records should be processed by the same processing device because: 1) the records relate to the same product; 2) the records relate to the same facility; and 3) the records relate to the same order. These constraints are only examples, other constraints are also possible.

In some embodiments, some or all of the constraints may be identified by a computer system, such as computer system 610 of FIG. 6, rather than by a user. For example, based on the fields present in the data sets, a computer system may be able to determine (possibly based on rules previously defined by a user) which fields and/or records are related and should be processed by the same processing device. As an example, the computer system may determine that records indicated as "reserved," such as by the field entitled "reservation status" of data set 110 of FIG. 1, should be processed by the same processing device. A reserved status may indicate that some other computer system is currently accessing that record. All records that are indicated as reserved by the "reservation status" field may be set aside and processed by the same processing device following each record's reserved status being cleared. In some embodiments, a small number of constraints may be received from a user and/or identified by a computer system, such as one, two, five, or ten. In other embodiments, dozens or hundreds of constraints may be received from a user and/or identified by a computer system.

At stage 850, a work table may be created from the data sets that were received at stage 820. The work table may contain some or all of the fields present in the various data sets. As such, all of the information that is to be processed may be present in the work table rather than being scattered in different data sets. The work table may be stored at a computer system, such as computer system 610 of FIG. 6, or may be stored in a database, such as database 640 of FIG. 6. The work table may contain space, such as in the form of fields for information in addition to the data present in the data sets. For example, space may be provided such that a value for each constraint may be stored for each record. As such, each record may be linked with an additional field for each constraint. An additional field may be linked with each record for a final constraint.

At stage 860, the values of constraints may be calculated for each constraint received at stage 840. For example, if, at stage 840, an indication of a first constraint is received that indicates all records having the same order number should be processed together, at stage 860, each record of the same order may have the same value of a first constraint. In some embodiments, the values of constraints are numbers. However, in other embodiments, another form of identifier may be used, such as a group of characters (e.g., letters, symbols, numbers, or some combination thereof). Following stage 860, each record within the work table may have a value for each constraint that was received at stage 840.

At stage 870, the values of a final constraint for each record present in the work table may be calculated. The final constraint may take into account each other constraint to ensure that groups of records that should be processed by a same processing device are assigned to and processed by the same processing device. The calculation of the final constraint for each record within the work table may be based on the other constraints calculated at stage 860. Embodiment 500 of FIG. 5 provides an example of a final constraint being calculated using two constraints (310 and 320). It should be understood that a larger number of constraints may be present. For example, a final constraint may be calculated using tens or hundreds of constraints. A final constraint for each record of the work table may be calculated at stage 870 as described in relation to embodiment 500 of FIG. 5.

As such, each record that should be processed by the same processing device as indicated by each constraint of the plurality of constraints may be linked with the same final constraint. In some embodiments, the values of the final constraint are numbers. However, in other embodiments, another form of identifier may be used, such as a group of characters (e.g., letters, symbols, numbers, or some combination thereof).

At stage 880, once each record has been linked with a value for a final constraint, records are distributed for processing. As such, if a final constraint for a dozen records is "348923," each record linked with this value of a final constraint would be distributed to the same processing device. In some embodiments, a computer system, such as computer system 610 of FIG. 6, may transmit the portions of the data sets (e.g., the records of the work table) to the appropriate processing device that is to process the records. In some embodiments, rather than transmitting the records to the processing devices, the computer system may provide an indication to each processing device of the records that the respective processing device is to process. Each processing device may then retrieve the appropriate records. These records may be retrieved from one or more databases, such as database 640. In some embodiments, the records are distributed to the processing devices in the form of a work table. An SQL statement may be passed to each processing device. Following receiving the SQL statement, the processing device may execute the SQL statement to receive all of the data that is responsible for updating. As an example, the following represents a sample SQL statement:

Value passed to Process 1:
SELECT * FROM WORKTABLE T0,SALESDETAIL T1,SALESHEADER T2 WHERE (T0.OrderNumber=T1.OrderNumber AND T0.LineNumber=T1.LineNumber AND T2.OrderNumber=T0.OrderNumber) and (T0.FinalConstraintValue=2)

Value Passed to Process 2:
SELECT * FROM WORKTABLE T0,SALESDETAIL T1,SALESHEADER T2 WHERE (T0.OrderNumber=T1.OrderNumber AND T0.LineNumber=T1.LineNumber AND T2.OrderNumber=T0.OrderNumber) and (T0.FinalConstraintValue IN (7,6))

Value Passed to Process 3:
SELECT * FROM WORKTABLE T0,SALESDETAIL T1,SALESHEADER T2 WHERE (T0.OrderNumber=T1.OrderNumber AND T0.LineNumber=T1.LineNumber AND T2.OrderNumber=T0.OrderNumber) and (T0.FinalConstraintValue IN (1,4,5))

Value Passed to Process 4:
SELECT * FROM WORKTABLE T0,SALESDETAIL T1,SALESHEADER T2 WHERE (T0.OrderNumber=T1.OrderNumber AND T0.LineNumber=T1.LineNumber AND T2.OrderNumber=T1.OrderNumber) and (T0.FinalConstraintValue IN (8,3,9))

While stage 880 details how records that have the same final constraint are distributed to the same processing device, stage 880 does not detail how many various groups of records are distributed to a particular processing device. An embodiment of a method for identifying which groups of records having the same final constraint should be distributed to which processing device is detailed in method 900.

At stage 890, each processing device may process its respective portions of the records. Once complete, the database(s) or other arrangement that store the data sets may be updated by each processing device. In some embodiments, the processed portions of the records may be transmitted to a computer system, such as computer system 610 of FIG. 6, which may then update the data sets.

Figure 9:
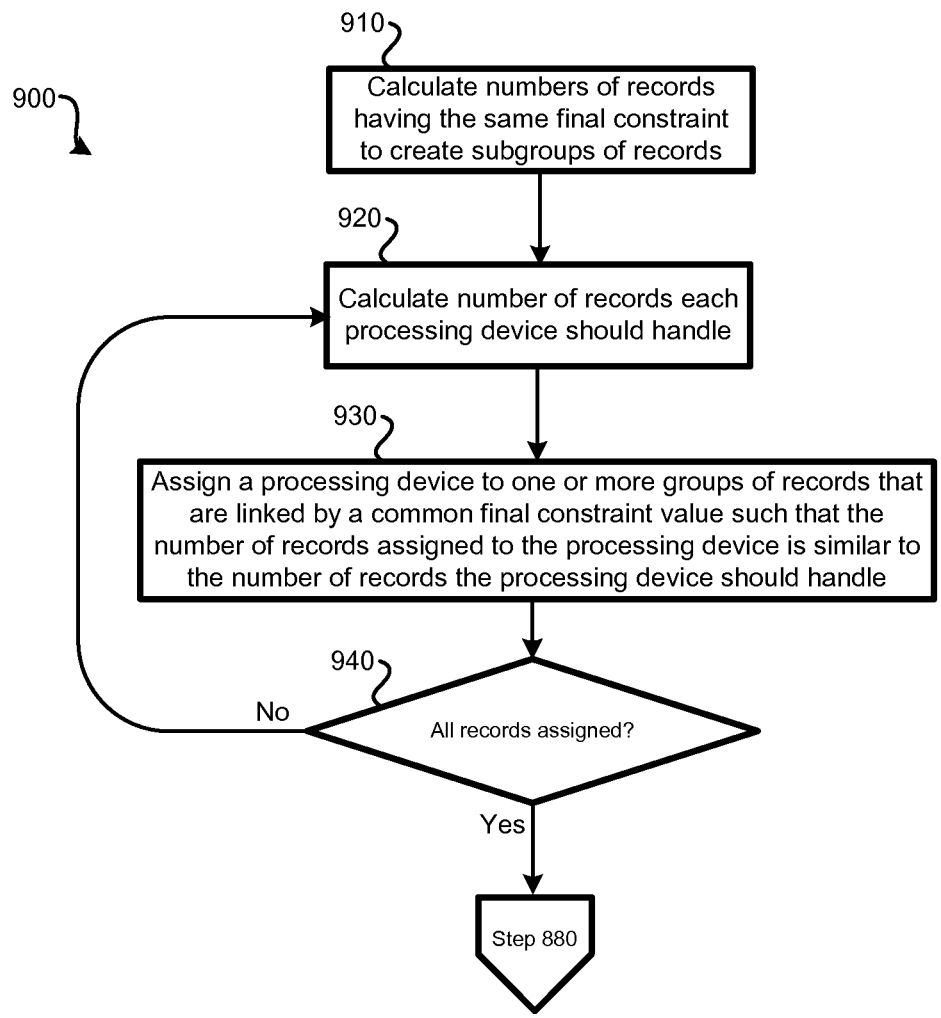
FIG. 9 illustrates an embodiment of a method for allocating portions of data sets to be processed using multiple processing devices.

FIG. 9 illustrates a method 900 for allocating records to be processed by different processing devices. Method 900 may be performed prior to stage 880 of FIG. 8. Method 900 may be used to determine the number of groups of records and which groups of records are distributed to each processing device for processing. Method 900 may be performed by a computer system, such as computer system 610 of FIG. 6.

At stage 910, the number of records having a value of a final constraint is calculated. As an example, referring to embodiment 500 of FIG. 5, the number of records having a final constraint value of 1 is 2, the number of records having a final constraint value of 2 is 6. Table 1 lists the number of records linked with each final constraint of embodiment 500 of FIG. 5.

TABLE 1

| Final Constraint Value | Number of records in group linked with the Final Constraint Value |
|---|---|
| 2 | 6 |
| 7 | 3 |
| 1 | 2 |
| 6 | 2 |
| 8 | 2 |
| 4 | 1 |

TABLE 1-continued

| Final Constraint Value | Number of records in group linked with the Final Constraint Value |
|---|---|
| 5 | 1 |
| 3 | 1 |
| 9 | 1 |

At stage 920, the average number of records each processing device should handle, based on the number of unassigned records, is calculated. For example, if there are four processing devices that each have the same processing capabilities and a total of 200 unassigned records, each processing device should process approximately 50 records. To illustrate method 900, embodiment 500 is used as an example. In embodiment 500 of FIG. 5, there are a total of 19 records to be processed that have not been assigned to a processing device. If four processing devices are to be used, each processing device may process approximately 4.74 (19 divided by 4) records. As such, this number may be rounded up such that the first processing device processes at least 5 records. Assigning each processing device approximately 5 records assumes that each processing device is capable of processing at roughly the same speed. If some processing devices are capable of faster or higher volume processing than other processing devices, it may be efficient to assign more records to the faster or higher volume processing devices. The remainder of this embodiment of method 900 assumes that each processing device has roughly the same processing speed and can handle approximately the same volume of records.

At stage 930, a group of records that has the same final constraint value (and, thus, are to be processed by the same processing device), is assigned to a particular processing device. At stage 920, referring to the example using embodiment 500, it was determined that each processing device should process approximately 4.74 records. The largest unassigned group of records linked with the same final constraint value may be selected. However, final constraint 2 has six records linked with it that are to be processed by the same processing device. Since these records must be processed by the same processing device according to the final constraint, these six records may be assigned to a single processing device. Since six is greater than the 4.74 records that each processing device should process, no additional groups of records may be assigned to this first processing device.

At stage 940, if all records have not yet been assigned, method 900 may return to stage 920. Returning to the example of embodiment 500, since records have not yet been assigned to a processing device, method 900 returns to stage 920. Here, the number of records each of the remaining processing devices should process may be recalculated factoring in that six records have been assigned to the first processing device. Since the first processing device was previously determined to process the six records linked with final constraint 2, then thirteen records remain to be assigned to a processing device. Thus, each remaining processing device should process approximately 4.33 records. 4.33 records is attained by dividing the thirteen remaining records by the three remaining processing devices. Again, 4.33 may be rounded up such that the second processing device processes at least 5 records.

Returning to stage 930, the largest unassigned group of records is linked with final constraint 7. Final constraint 7 has three records linked with it. Since three is below 4.33, additional groups of records may be assigned to the same processing device. The records linked with final constraint 6 may be assigned to the same processing device. Final constraint 6 is linked with two records. As such, the second processing device may process records linked with final constraints 7 and 6. Thus, this second processing device may process a total of five records.

In this example, since more records remain unassigned, method 900 returns to stage 920. In the third iteration of method 900, two processing devices remain and eight records remain unassigned. Therefore, each of the remaining two processing devices should be assigned approximately four records for processing (eight records divided by two processing devices). Therefore, at stage 930, the records linked with final constraint 1, final constraint 4, and final constraint 5 (a total of four records) may be assigned to the third processing device.

Again, records have yet to be assigned, so method 900 may return to stage 920. Since only one processing device has yet to have records assigned to it, all remaining records linked with final constraints may be assigned to the fourth processor. In this example, four records remain: those linked with final constraints 8, 3, and 9. These records may be assigned to the fourth processor.

Therefore, the first processing device is assigned 6 records, the second processing device is assigned 5 records, and the third and fourth processing devices each are assigned 4 records for processing while maintaining the groups defined by the final constraints are processed by the same processing device. Since no additional records remain to be assigned, at stage 940, method 900 may proceed to step 880 of FIG. 8 for distribution of the records to the processing devices assigned at stage 930.

While method 900 details a possible way of determining which processing device is assigned various groups of records, it should be understood that other ways of apportioning the groups of records linked with the final constraints is also possible.

FIG. 10 illustrates an embodiment of a computer system. A computer system as illustrated in FIG. 10 may represent computer system 610 of FIG. 6 or any of the previously described processing devices, such as processing devices 630 of FIG. 6. For example, computer system 1000 can represent some of the components of the mobile devices and/or the remote computer systems discussed in this application. FIG. 10 provides a schematic illustration of one embodiment of a computer system 1000 that can perform the methods provided by various other embodiments, as described herein, and/or can function as the host computer system, a remote kiosk/terminal, a point-of-sale device, a mobile device, and/or a computer system. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard and/or the like; and one or more output devices 1020, which can include without limitation a display device, a printer and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as the system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices, such as network input/output devices, may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communication subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

Common forms of physical and/or tangible non-transitory computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc., carried by the signals) to the working memory 1035, from which the processor(s) 1005 retrieves and executes the instructions. The instructions received by the working memory 1035 may optionally be stored on a storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for processing data sets using multiple processors, the method comprising:
   receiving, by a computer system, a plurality of data sets, wherein:
      each data set comprises a plurality of records;
      each record comprises a plurality of fields;
      the pluralities of records from the plurality of data sets are, in total, referred to as the set of records;
      at least a subset of the plurality of records within each data set are linked with records within another data set;
   receiving, by the computer system, a plurality of constraints, wherein:
      each constraint of the plurality of constraints identifies a data relationship that requires a subset of the set of records to be processed by a same processing device;
   calculating, by the computer system, a plurality of final constraints, wherein:
      each final constraint of the plurality of final constraints is linked with a record;
      each final constraint of the plurality of final constraints is at least partially based on the plurality of constraints; and
      final constraints of the plurality of final constraints having a same value are linked with records that are to be processed by the same processing device; and
   distributing, by the computer system, at least partially based on the final constraint, the set of records to a plurality of processing devices for processing.

2. The method for processing data set using multiple processors of claim 1, further comprising:
   calculating, by the computer system, at least partially based on the plurality of final constraints, subsets of the set of records that are to be processed by each processing device of the plurality of processing devices.

3. The method for processing data set using multiple processors of claim 1, further comprising:
   creating, by the computer system, a work table, wherein:
      the work table comprises the set of records; and
      the work table is used to calculate the plurality of final constraints.

4. The method for processing data set using multiple processors of claim 1, wherein the plurality of data sets represent enterprise resource planning information.

5. The method for processing data set using multiple processors of claim 1, further comprising:
   calculating, by the computer system, a number of processing devices to include in the plurality of processing devices for processing the set of records.

6. The method for processing data set using multiple processors of claim 1, further comprising:
   receiving, by the computer system, from a user, a number of processing devices to include in the plurality of processing devices for processing the set of records.

7. The method for processing data set using multiple processors of claim 6, further comprising:
   receiving, by the computer system, from the user, an indication of a process to be balanced, wherein the process is linked with the plurality of datasets.

8. The method for processing data set using multiple processors of claim 1, wherein at least one dataset of the plurality of data sets comprises sales records.

9. A computer program product residing on a non-transitory processor-readable medium and comprising processor-readable instructions configured to cause a processor to:
   receive a plurality of data sets, wherein:
      each data set comprises a plurality of records;
      each record comprises a plurality of fields;
      the pluralities of records from the plurality of data sets are, in total, referred to as the set of records;
      at least a subset of the plurality of fields within each data set are linked with fields within another data set;
   receive a plurality of constraints, wherein:
      each constraint of the plurality of constraints identifies a data relationship that requires a subset of the set of records to be processed by a single processing device;
   calculate a plurality of final constraints, wherein:
      each final constraint of the plurality of final constraints is linked with a record;

each final constraint of the plurality of final constraints is at least partially based on a subset of the plurality of constraints; and final constraints of the plurality of final constraints having a same value are linked with records that are to be processed by the single processing device; and distribute at least partially based on the final constraint, the set of records to a plurality of processing devices for processing.

10. The computer program product of claim 9, wherein the processor-readable instructions further comprise instructions configured to cause the processor to:

calculate at least partially based on the plurality of final constraints, subsets of the set of records that are to be processed by each processing device of the plurality of processing devices.

11. The computer program product of claim 9, wherein the processor-readable instructions further comprise instructions configured to cause the processor to:

create a work table, wherein:
the work table comprises the set of records; and
the work table is used to calculate the plurality of final constraints.

12. The computer program product of claim 9, wherein the plurality of data sets represent enterprise resource planning information.

13. The computer program product of claim 9, wherein the processor-readable instructions further comprise instructions configured to cause the processor to:

calculate a number of processing devices to include in the plurality of processing devices for processing the set of records.

14. The computer program product of claim 9, wherein the processor-readable instructions further comprise instructions configured to cause the processor to:

receive, from a user, a number of processing devices to include in the plurality of processing devices for processing the set of records.

15. A system for processing data sets using multiple processors, the system comprising:

a processor; and
a memory communicatively coupled with and readable by the processor and having stored therein a series of instructions which, when executed by the processor, cause the processor to:

receive a plurality of data sets, wherein:
each data set comprises a plurality of records;
each record comprises a plurality of fields;
the pluralities of records from the plurality of data sets are, in total, referred to as the set of records;
at least a subset of the plurality of fields within each data set are linked with fields within another data set;

receive a plurality of constraints, wherein:
each constraint of the plurality of constraints identifies a data relationship that requires a subset of the set of records to be processed by a single processing device;

calculate a plurality of final constraints, wherein:
each final constraint of the plurality of final constraints is linked with a record;
each final constraint of the plurality of final constraints is at least partially based on a subset of the plurality of constraints; and
final constraints of the plurality of final constraints having a same value are linked with records that are to be processed by the single processing device; and distribute at least partially based on the final constraint, the set of records to a plurality of processing devices for processing; and the plurality of processing devices, wherein each of the plurality of processing devices is configured to:
receive a portion of the set of records, wherein each portion of the set of records is distributed at least partially based on the plurality of final constraints; and
process the portion of the set of records.

16. The system for processing data set using multiple processors of claim 15, wherein the series of instructions, when executed by the processor, further cause the processor to:

calculate, at least partially based on the plurality of final constraints, subsets of the set of records that are to be processed by each processing device of the plurality of processing devices.

17. The system for processing data set using multiple processors of claim 15, wherein the plurality of data sets represent enterprise resource planning information.

18. The system for processing data set using multiple processors of claim 15, wherein the series of instructions, when executed by the processor, further cause the processor to:

calculate a number of processing devices to include in the plurality of processing devices for processing the set of records.

19. The system for processing data set using multiple processors of claim 15, wherein the series of instructions, when executed by the processor, further cause the processor to:

receive, from a user, a number of processing devices to include in the plurality of processing devices for processing the set of records.

20. The system for processing data set using multiple processors of claim 19, wherein the series of instructions, when executed by the processor, further cause the processor to:

receive, from the user, an indication of a process to be balanced, wherein the process is linked with the plurality of datasets.

* * * * *

UNITED STATES PATENT AND TRADEMARK OFFICE
CERTIFICATE OF CORRECTION

PATENT NO. : 8,458,348 B2
APPLICATION NO. : 13/092537
DATED : June 4, 2013
INVENTOR(S) : Vance et al.

Page 1 of 1

It is certified that error appears in the above-identified patent and that said Letters Patent is hereby corrected as shown below:

In the Drawings

On sheet 7 of 10, in figure 7, Referral Numeral 725, line 2, delete "contraints" and insert -- constraints --, therefor.

In the Specification

In column 5, line 63, delete "2" and insert -- 2) --, therefor.

Signed and Sealed this
First Day of October, 2013

Teresa Stanek Rea
*Deputy Director of the United States Patent and Trademark Office*